United States Patent

Medeksza

[11] Patent Number: 5,342,152
[45] Date of Patent: Aug. 30, 1994

[54] METHOD AND APPARATUS FOR FORMING INTERMITTENT CHIPS WHILE MACHINING HOLES WITH A ROTATING TOOL

[76] Inventor: Ludwik A. Medeksza, 3175 W. 42nd St., Erie, Pa. 16506

[21] Appl. No.: 882,846

[22] Filed: May 14, 1992

Related U.S. Application Data

[63] Continuation-in-part of Ser. No. 596,041, Oct. 11, 1990, Pat. No. 5,113,728.

[51] Int. Cl.$^5$ ............................................. B23B 47/22
[52] U.S. Cl. ...................................... 408/1 R; 408/17
[58] Field of Search ................. 408/17, 1 R; 82/118, 82/132, 133, 134, 137, 1.11, 158, 904

[56] References Cited

U.S. PATENT DOCUMENTS

2,630,723  3/1953  Gridley .................................. 408/17
2,768,830  10/1956  Janson .............................. 279/121 X Primary Examiner—Z. R. Bilinsky
Attorney, Agent, or Firm—Brooks & Kushman

[57] ABSTRACT

The formation of intermittent chips or chip breakage is assured while machining holes using a rotating tool means by causing the undeformed chip thickness to vary periodically and be reduced to zero in each period of its variation. To obtain the periodic reduction of the undeformed chip thickness to zero, a cutting tool is made to oscillate along its axis of rotation. Tool oscillation is controlled so that the position of the tool along the feed advance path depends on the angular displacement of the tool. The number of oscillation cycles per revolution of the tool may be freely chosen depending on the required length of chip segments. The oscillation amplitude needed to form intermittent chip depends on this number, feed advance per revolution, and number of major cutting edges of the tool means. The oscillatory movement of the tool may be enforced in many ways. This method may be used in all hole machining operations where tool is rotating, such as boring, counterboring, countersinking, drilling, and reaming.

21 Claims, 8 Drawing Sheets

METHOD AND APPARATUS FOR FORMING INTERMITTENT CHIPS WHILE MACHINING HOLES WITH A ROTATING TOOL

CROSS-REFERENCE TO RELATED APPLICATION

This application is a continuation-in-part of U.S. Ser. No. 596,041, filed Oct. 11, 1990, now U.S. Pat. No. 5,113,728 titled Method and Apparatus for Forming Intermittent Chips When Machining a Rotating Workpiece.

TECHNICAL FIELD

The invention relates to a method for forming an intermittent chip and producing separate chip segments or chip breakage while machining a hole using a rotating tool, by means of varying the chip thickness and reducing it periodically to zero. The invention further relates to an apparatus for carrying out the method of the invention.

BACKGROUND

Contemporary automated machine tools distinguish themselves with relatively high productivity. This productivity results both from the elimination of manual labor and application of high cutting velocity using advanced cutting tool materials. Such factors are especially important in light of the current trend toward a totally unmanned factory in the not-so-distant future.

However, while machining holes in the vast majority of materials used in machine parts today, an unwelcome obstacle is encountered. As a by-product of the hole-making process, continuous chips are formed. These chips create serious problems connected with chip formation during machining. The problems become especially acute in drilling deep holes and high speed hole boring. For instance, in drilling, long bands of the continuous chips press against the machined surface of the hole as they move along the drill flutes, increasing the roughness of the machined surface. The chips also tend to clog tool flutes. When this occurs, feed motion must be stopped so that the bands of tangling chips can be removed. Still further, these chips have a tendency to accumulate in the limited working space surrounding a tool. This is difficult to overcome and is an obstruction to the efficient utilization of automated tooling. Moreover, the chips frequently cause, if left unattended, the premature wear and/or failure of the tooling as well as damage to the machined surface. Additionally, continuous chips can become entangled about the tool, the workpiece, and/or rotating elements of the machine tool system.

Generally, unless monitored and removed constantly from the working space, such chips are hazardous to the tool, the machine, the quality of the product, and the operator (if any). Unfortunately, in practice, the removal of whirling chips can usually be accomplished only manually. The feed motion is interrupted from time to time and the tool is withdrawn from the material being drilled. As a result, a long band of chip is broken. But such manual labor applied to automatic machine tools, including NC and CNC machine tools, contradicts fundamental principles of their economic utilization in a manufacturing process. The automated versions of this procedure, such as periodic stopping of the feed motion and/or total or partial withdrawal of the tool from the hole being machined, do not solve the problem since they lengthen the overall drilling operation. Moreover, driving a heavy machine tool headstock or carriage at a periodically varying velocity causes undesirably strong dynamic forces due to the huge masses subjected to periodic accelerations and decelerations, adversely affecting the machine tool, the accuracy of the machining, and, often, the machined surface roughness. These limitations are particularly serious and critical when machining at high rotary tool speeds since the high frequency of the headstock velocity variations causes excessive inertia forces. Other conventional approaches, based on avoiding certain ranges of cutting parameters, inevitably result in partial utilization of expensive automatic machine tools because problems with continuous chips are characteristic of high cutting speed and feed rate. In addition, even the chips produced at lower cutting speeds and feed rates frequently maintain their continuous form. However, by using the apparatus and method of the present invention in machine shop practice, the necessity of manual chip removal is simply avoided.

Conventional chip breakers would have solved such problems long ago if they were effective and reliable. Although they are relatively inexpensive and simple, conventional chip breakers are ineffective beyond the narrow ranges of cutting parameters for which they are designed. Any change in cutting speed, feed rate, and depth of cut affects the performance of conventional chip breakers. In addition, for many materials, usually referred to as "difficult-to-machine" or "space-age materials," they are entirely ineffective. Economically, the most disadvantageous feature of traditional chip breakers is that their use shortens the effective life of a cutting tool, simply because the chip-breaking action is far outlasted by the tool itself.

In the prior art, various modes of vibration applied to the cutting tool have been attempted, especially when drilling, as a means for chip breaking. However, tool vibration alone does not ensure the formation of intermittent chips, since chip breakage is a function of the rotating tool's angular position and position along its feed advance path. Uncontrolled periodic variation of chip thickness may produce chips having a thickness which is only randomly reduced to zero. But this causes equally uncontrolled and random chip separation or breaking.

In order to provide additional background information so that this invention may be completely understood and appreciated in its proper context, reference may be made to the following publication and patent, the disclosures of which are incorporated by reference: C. H. Kahng, et al., "Study of Chip Breaking During Twist Drilling," SME Tech. Papers, Ser. MR at Ann. Conf. - Book 2, Cleveland, Ohio, Apr. 26-29, 1976; U.S. Pat. No. 3,431,799, issued to J. R. Bashor.

C. H. Kahng, et al. presented their study of the fundamental characteristics of chip formation and chip breaking in the twist drilling operation. Results of their investigation confirm the description of the prior art given above. The authors concluded that the size of the chip can be reduced and well-broken chips obtained, when an oscillation is applied between drill and workpiece. They also considered the use of a stepped feed drive for chip breaking, suggesting that the length of the chip could be controlled in this manner. However, the Kahng, et al. paper does not disclose any further details regarding these methods nor does it disclose apparatus capable of carrying out the methods.

U.S. Pat. No. 3,431,799 discloses a chip breaker for the drilling operation. The apparatus is a multiple-spindle drill head, the use of which is limited to a drilling operation. The drill head housing is actuated, so as to produce alternating lowering and elevating movements of the housing and the drills, spindles, and associated driving gears carried thereby. The actuation of the drill head is independent of the feed rate, such that there is no relation between the length or number of chip segments and the tool revolution, as well as between the tool angular position and its position along the feed advance path. It follows that it is impossible to find and use key operating parameters (described in greater detail herein below), such as the optimum phase $\phi$ and the optimum double amplitude-to-feed ratio $2A/p$. The reciprocal movement of the head periodically withdraws cutting edges of all the drills from the material being drilled and interrupts the cutting action of the drills. There are alternate drilling and non-drilling periods. During the non-drilling periods, no chips are produced, resulting in the breakage of continuous chips. The method embodied in this apparatus is essentially an automated version of what is conventionally done manually to break long bands of continuous chips, with all of the attendant disadvantages of this approach previously described.

Upon review of the prior art based on application of tool vibration or oscillation, it may be observed that intermittent chip forming has been obtained only randomly, depending on constantly changing phase $\phi$ due to absence of the dependence of the tool's axial position on its angular position.

Whatever the precise merits, features and advantages of the known prior art, including the above discussed references, none achieves or fulfills the purposes of the method and apparatus of the present invention. To advance the art, it is preferable that the cutting tool be made to occupy strictly determined and controlled positions along its feed advance path in response to angular positions of the rotating tool. Also, full flexibility is needed in selecting phase $\phi$ and ratio $2A/p$ to obtain the best surface finish and the longest tool life. Additionally, it would be desirable to apply the method to all machining operations that can be performed using a rotating tool that has 'n' cutting edges.

SUMMARY OF THE INVENTION

It is therefore an object of the present invention to provide a method for reliably producing intermittent chips, that is, the chips which are produced consistently in a form of short segments when machining a hole using a rotating tool that has one or more cutting edges as, for example, when boring, counterboring, countersinking, drilling, and reaming.

It is another object of the present invention to provide an apparatus for carrying out the method with various values of the phase $\phi$ and/or the double amplitude-to-feed ratio $2A/p$ to obtain the optimal surface finish and/or the maximum tool life.

It is yet another object of the invention to achieve uniform chip segments of a predetermined length.

It is still another object of the invention to provide an apparatus for carrying out such a method and its improvements which is of compact construction.

Yet another object of the invention is to provide a method and apparatus wherein the cutting tool occupies strictly determined and controlled positions along its axis of rotation in response to the angular position of the cutting tool.

Yet still another object of the invention is to provide an apparatus wherein as small masses as possible are subjected to periodic accelerations and decelerations, such that holes having small diameters can be machined at high rotary speeds.

It is another object of the invention to provide an apparatus in a form that fits most standard machine tool spindle sockets and/or allows for easy adaptation.

Finally, it is an object of the invention to allow an apparatus to be used for many modes of machining such as boring, counterboring, countersinking, drilling, reaming, etc.

The above-described problems and objects may be solved and met by the method and apparatus of the invention, wherein a rotating cutting tool is made to occupy strictly determined and controlled positions along its axis of rotation in response to its angular positions when cutting, so that the undeformed chip thickness periodically varies and is reduced to zero in each period of its variation. As a result, intermittent chips are formed. Instead of a long and continuous chip, short and convenient-to-handle chip segments are produced. The chip length can be selected freely by choosing the number of the segments obtained during one tool revolution. In the preferred embodiment of the invention, two revolutions of the tool have been chosen to produce one segment of the chip. The tool nose moves along a wave-like path relative to the workpiece. The path wave has a certain amplitude A and length $\lambda$. The number of lengths per circumference of the machined surface is equal to the number of the chip segments obtained during one workpiece revolution.

The relation between positions of the cutting tool along its axis of rotation in response to the angular position of the tool, which may be freely adjusted, is independent of the rotary speed of the tool. Hence, once a given relation has been chosen by selecting the amplitude of the tool path wave and the desired number of the segments to be produced during one revolution of the tool, this relation is not affected by changes in rotary speed of the tool. If the rotary speed is maintained constant, a periodically varying feed advance velocity is produced which consists of a constant component and a periodically varying component. The constant component is defined as a distance p travelled by the tool nose along a feed advance path per time needed for one revolution of the tool. The constant component of the feed advance velocity is produced, in the preferred embodiment of the invention, by the feed motion of a machine tool spindle. The periodically varying component of the feed advance velocity of the tool is produced, in the preferred embodiment of the invention, by causing the tool to oscillate along its axis of rotation relative to the machine tool spindle. However, the periodically varying feed advance velocity may also be produced by causing a table or a carriage, or other workpiece supporting subassembly of a machine tool, to move both with constant feed advance and periodically varying feed advance velocities. In addition, the periodically varying component may be produced by causing a machine tool headstock or a spindle to oscillate along the feed advance path. The oscillatory motion may be produced using hydraulic, pneumatic, electromagnetic, piezoelectric and mechanical actuators.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
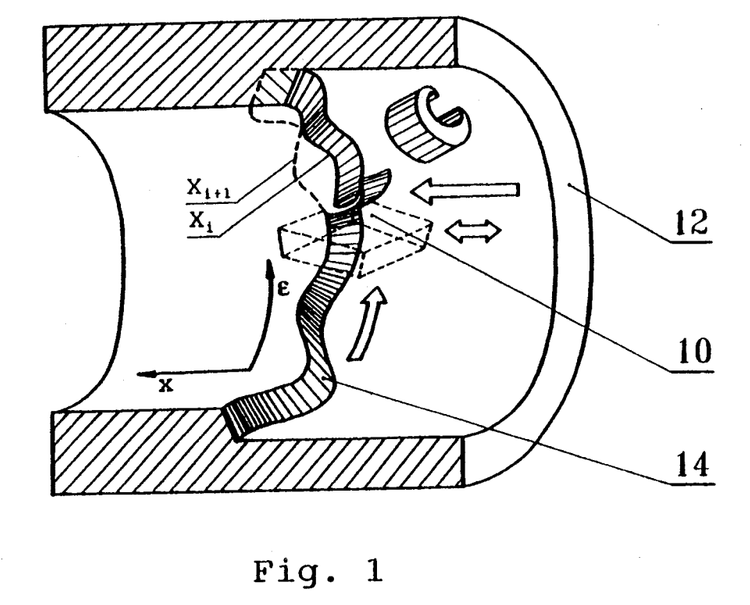
FIG. 1 is a perspective view that illustrates the principle of kinematic chip breaking upon which this invention is based.

Referring now to FIG. 1 of the drawings, there is illustrated in phantom a tool nose 10 which describes a generally wave-like path in relation to a workpiece 12. The tool nose 10 represents not only the cutting insert of a boring bar, as shown in FIG. 1, but also a nose of any cutting tool that performs a rotative motion with respect to the machined surface of a hole. The same waviness as that of the tool nose path is left by the major cutting edge on the cut surface 14.

Figure 2:
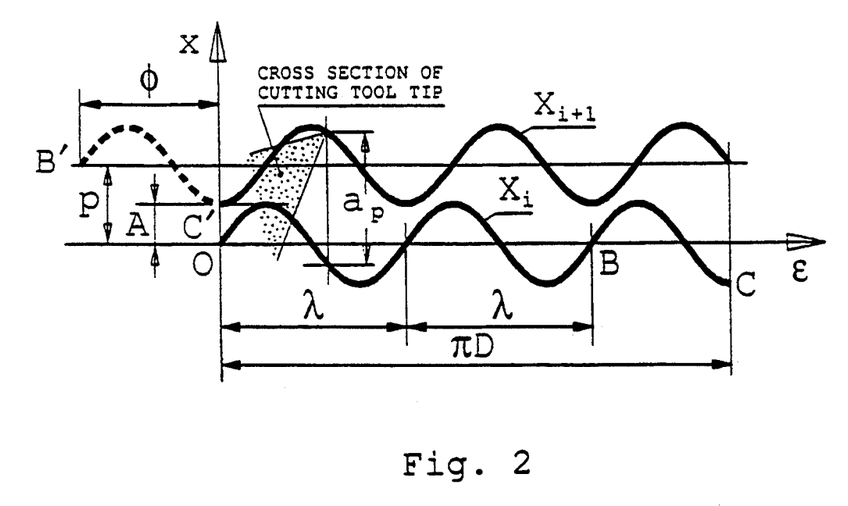
FIG. 2 is a graph which shows two developed coils of the tool nose path.

As best shown in FIG. 2, the path wave has a certain amplitude A and length $\lambda$. Neglecting a slight inclination of the tool nose path helical line, two developed consecutive coils of the tool nose path are shown. The vertical axis x is parallel with the direction of the feed motion vector. Each value of x corresponds with an instantaneous tool nose position in this direction. The angular displacement of the tool nose and the cutting edge during its oscillation $\epsilon$ is represented along the horizontal axis by the formula:

$$\epsilon = \omega t \quad (1)$$

where $\omega$ is the angular frequency of tool oscillation. The distance between the neutral lines of the tool nose path coils equals the distance p which defines the constant component of the feed advance velocity when related to time per one tool revolution.

Assuming a sine waveform of tool nose path waviness, it is possible to take advantage of the concept of a phase shift as used in harmonic analysis. Thus, as shown in FIG. 2, the path coil $X_{i+1}$ is shifted relative to the path coil $X_i$ in the direction of the axis $\epsilon$. The quantity $\phi$ determines the phase, which is substantially the same between any two consecutive tool nose path coils. If the cutting tool nose moves, during a given interval, along the path coil $X_{i+1}$ (compare FIG. 1 and FIG. 2), a form of the path coil $X_i$ defines the shape of the upper uncut chip surface and a form of the path coil $X_{i+1}$ defines the lower one, i.e. the shape of the cut face 14. Hence, a value of $\phi$ determines also the phase shift of the cut face 14 relative to the upper surface of the uncut chip. Preferably, the value of $\phi$ is obtained from the equation:

$$\phi = 2\pi[N - I(N)] \quad (2)$$

where N is a selected number of waves of the wavy tool nose path per circumference of the machined surface and I(N) is the integer part of N.

Owing to tool oscillation and the resulting cut face waviness, the uncut chip thickness $a_p$ is being periodically changed during machining. However, to obtain intermittent chip forming, changing the thickness is not sufficient. The thickness is preferably periodically reduced to zero, i.e., the curves representing any two consecutive tool nose path coils preferably have points of tangency or they preferably intersect.

Figure 3:
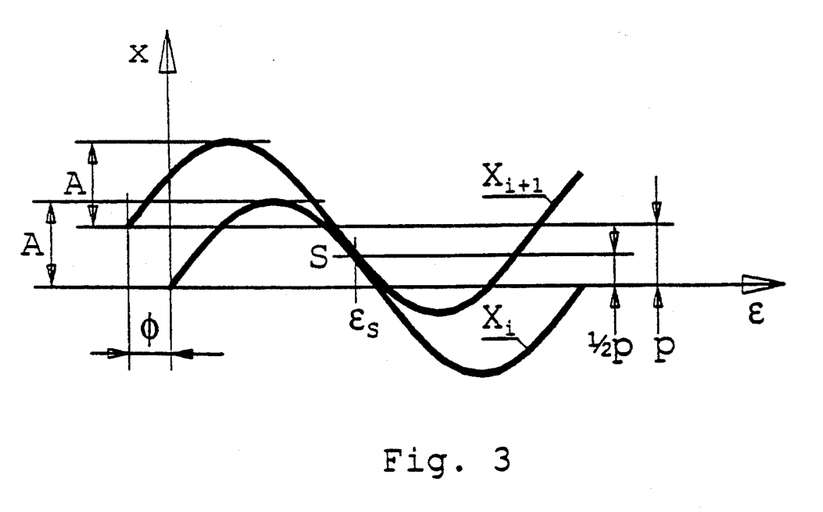
FIG. 3 is a graph which shows any two coils of tool nose path that meet the condition for intermittent chip forming.

Referring now to FIG. 3, this condition generally corresponds to contacting the sine curve $X_i$ and the sine curve $X_{i+1}$ at least at the point S. From this assumption, the following inequality involving the double amplitude ratio 2A/p results:

$$2\frac{A}{p} \geq \operatorname{cosecant}\left(\frac{\phi}{2}\right) \quad (3)$$

where A is the amplitude of tool path wave, p is the distance between neutral lines of any two consecutive tool nose path coils and $\phi$ is the phase shift as explained above.

The inequality (3) defines the condition for intermittent chip forming when a tool is used that has only one major cutting edge, as when boring an inside surface of revolution using a single tool. For certain workpiece materials that exhibit some brittleness, the chip can break into separate segments even before this condition is met, i.e., when the amplitude A is slightly less than that resulting from the inequality.

Figure 4:
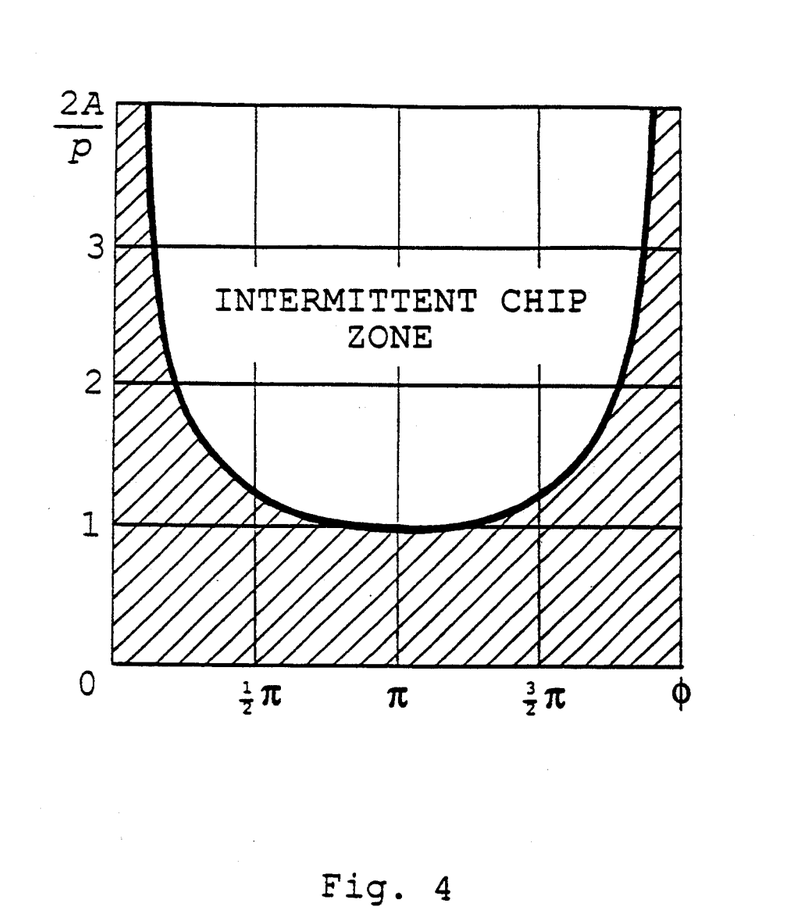
FIG. 4 is a graph of certain parameters that illustrate a zone of intermittent chip forming.

As best shown in FIG. 4, for phase $\phi$ values equal to 0, $2\pi$, $4\pi$, and the like, obtaining intermittent chip forming is impossible independently of the amplitude of the tool path wave. These values, as well as all others in ranges $0-0.25\pi$, $1.75\pi-2.25\pi$, $3.75\pi-4.25\pi$, $5.75\pi-6.25\pi$ and the like, should be avoided, since they require an impractically great amplitude of the tool path wave to cause intermittent chip forming.

Figure 5:
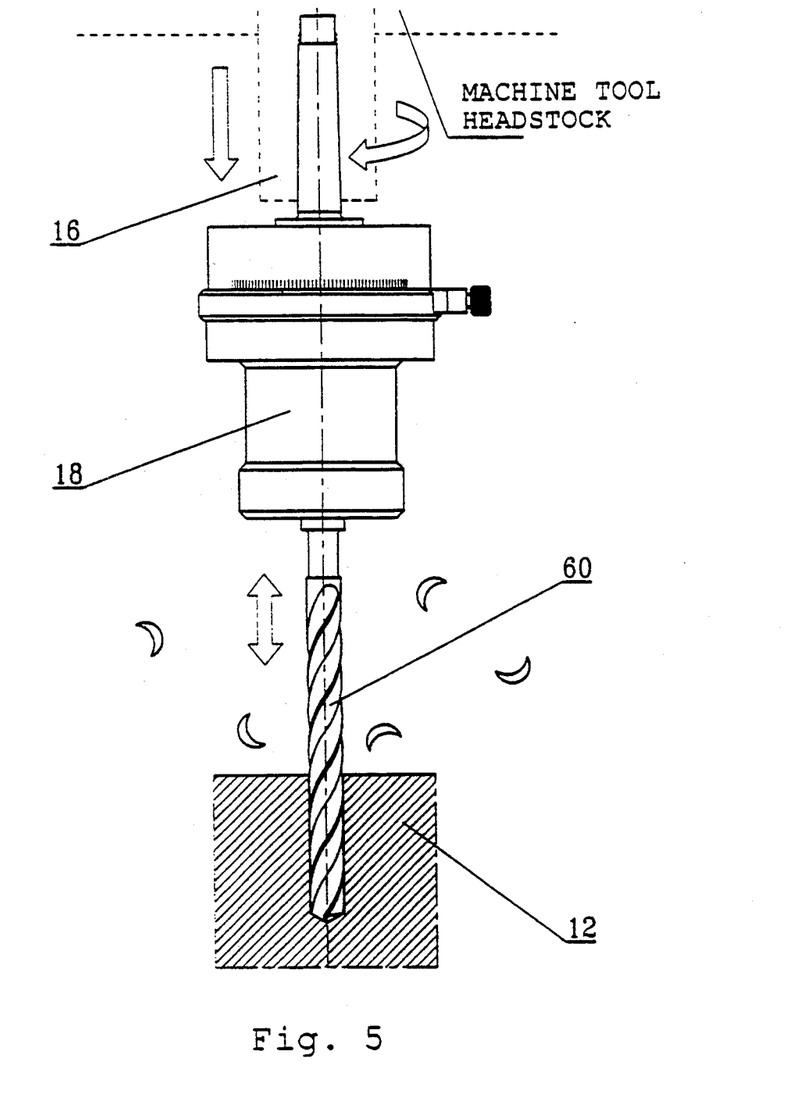
FIG. 5 is a front view of an apparatus according to the present invention for producing an intermittent chip.
Figure 6:
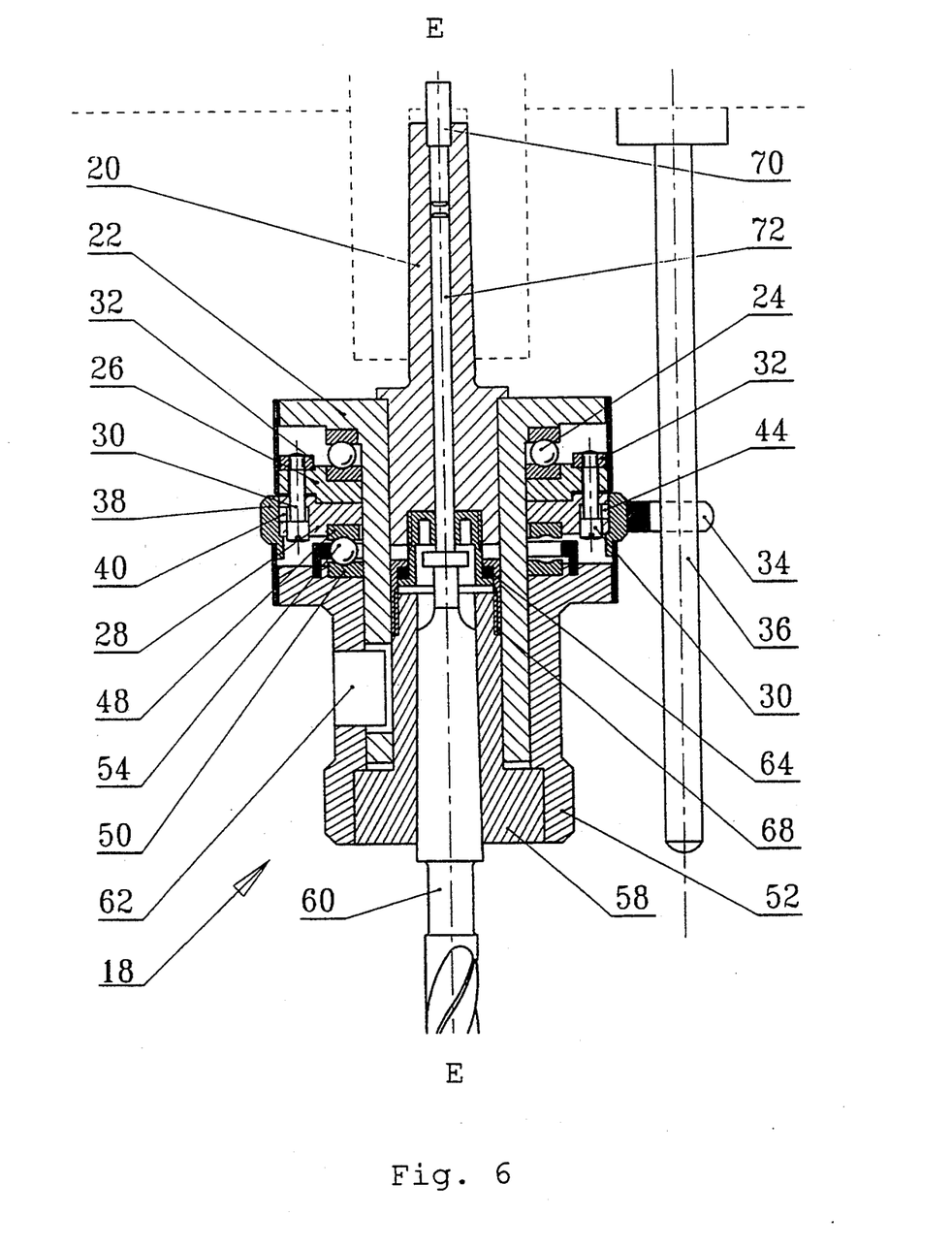
FIG. 6 is a right side view of an axial cross section of the assembly of an oscillatory drill chuck according to the present invention.
Figure 7:
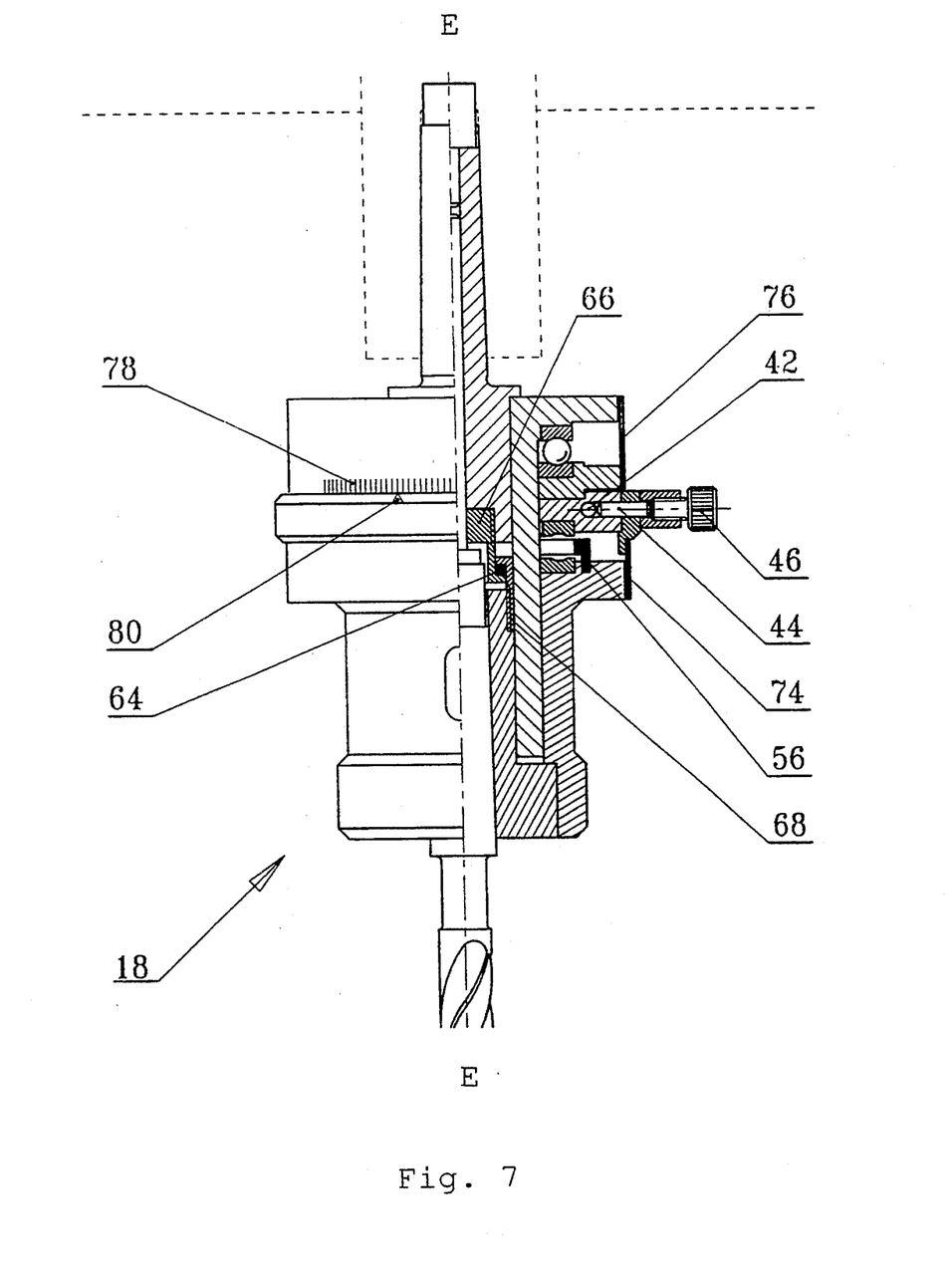
FIG. 7 is a front half-view, half-axial cross section of the assembly of an oscillatory drill chuck according to the present invention.

Referring now to FIGS. 5, 6 and 7, in the preferred embodiment of this invention, a tool drive means is provided for causing rotation of a tool means which comprises a machine tool spindle 16 and its driving system, a shank 20 of the apparatus for carrying out the method of the invention 18, a guiding sleeve 22, and key or a spline 62, a sliding sleeve 52 and a tool socket 58.

Also, a tool means is provided to make it possible to reduce material contained in a machining allowance layer to chips. It should be understood that the term "tool means" is not limited to only a boring bar or a drill having only one major cutting edge. It is intended to include also various multi-edge tools, i.e., tools which have n-edges, where n is a natural number. These multi-edge tools include boring bars, counterbores, countersinks, drills, reamers, and other types of cutting tools which are or can be used to machine a hole in a stationary workpiece and which otherwise produce continuous chips.

A formula is provided, in accordance with this invention, that makes it possible to compute and adjust, manually or automatically, the amplitude A of the tool nose path waviness needed to achieve intermittent chip. The formula is as follows:

$$A \geq \left| \frac{p}{2n} \operatorname{cosecant} \left( \frac{N}{n} \pi \right) \right| \quad (4)$$

where n is number of cutting edges in the tool 60 used, p is the distance between neutral lines of any two consecutive tool nose path coils produced by a given tool nose, and N is a selected number of waves of the wavy tool nose path per circumference of the machined surface. The inequality (4) defines the condition for intermittent chip forming when a tool means is used that has any number n of major cutting edges. As stated earlier, the approach disclosed herein is not limited to a tool that has only one major cutting edge.

In order to carry out the method of the invention, a feed drive means is provided for overcoming the force which resists machining and acts along the feed advance path and for driving the tool 60 so that the tool nose path is wavy and the distance p is constant and adjustable. The feed drive means preferably comprises a constant feed drive means and a varying feed drive means. To perform its function properly, the feed drive means must follow a control signal generated to meet the requirement of the inequality (4). A feed control means is provided to produce the control signal that causes the tool 60 to achieve strictly determined positions along the axis of rotation of the tool in response to the angular positions of the tool. These two kinds of the tool positions combined result in a wavy, helical line described by a tool nose on a machined surface, as shown in FIGS. 1, 2, and 3.

With continued reference to FIGS. 2 and 5, to obtain the constant distance p between any two consecutive tool nose path coils produced by a given tool nose, feed advance motion of a machine tool spindle, carriage or slide may be used. In the preferred embodiment of the invention, a machine tool spindle 16 performs the constant feed advance motion. The constant feed advance motion of the spindle 16 is kinematically coupled with its rotation so that the spindle travels always a constant but adjustable distance p along its rotation axis per one revolution. The total transmission ratio between the spindle rotation and its feed motion may be easily changed or adjusted. In other words, the spindle driving system, the carriage driving system or the slide driving system provides a constant feed drive means. A machine tool controls and adjustments provide means for adjusting and controlling the constant feed drive means.

The oscillatory tool motion achieved in response to the rotating spindle angular position may be obtained in many ways. As a specific example, the tool may be driven by a mechanical, electrohydraulic, electromechanical, magnetostrictive, or piezoelectric oscillator properly responding to the angular position of the rotating spindle. By properly responding, it is meant that each deflection from the neutral position produced by an oscillator is connected with and controlled by a specific angular position of the spindle and/or tool. Also, as mentioned earlier, a carriage or a slide of a machine tool can be given a feed motion with a velocity which periodically varies in response to the spindle rotation. Any oscillator capable of impressing strictly determined axial positions of tool means, independently of the resisting forces, in response to a signal produced by the feed control means provides varying feed drive means. In the preferred embodiment of the invention, a mechanical tool oscillator is used in the form of a cam mechanism driven by the machine tool spindle rotation.

As best shown in FIGS. 6 and 7, the oscillator is built in an apparatus that has the form of a drill chuck 18. The shank 20 of the chuck is rotated by the spindle of a machine tool, for instance a drill press. The shank rotation is transmitted through a guiding sleeve 22, a key (or a spline) 62 and a sliding sleeve 52 to a tool means socket 58. The key, which is mounted in the sliding sleeve, is generally parallel with the axis of the tool 60 and can move freely in a keyway. The keyway is preferably made in the guiding sleeve 22 which is seated on the shank 20 of the chuck.

Referring now to FIGS. 6–9, rotation of the sliding sleeve is transmitted to a rotary thrust bearing race 50 which is mounted thereon. A single rolling element, preferably a bearing ball 54, is placed on the rotary race. As the rotary race revolves, the rolling element 54 rolls over the thrust bearing race 48, which is placed above the rotary one and held stationary. When the stationary and rotary races are parallel as shown in FIG. 10, i.e., their relative angle of inclination is zero, the amplitude of oscillation produced is also zero. The inclination of the stationary race 48 with respect to the rotary race 50 may be changed and adjusted in accordance with the required amplitude of tool oscillation since the amplitude depends on that angle.

The stationary thrust bearing race 48 provides controllable drive means. As the rolling element 54 moves along the circumference of the inclined stationary thrust bearing race 48, the rotary thrust bearing race 50 translates back and forth along the centerline of the chuck. In the preferred embodiment, the oscillatory motion of the rotary thrust bearing race is transmitted through a movable element (such as the sliding sleeve 52) to a tool support. A tool socket 58 made in the tool support provides means for transmitting oscillation from the tool support to a tool which is installed in that socket.

Thus, the rotary thrust bearing race 50, the stationary thrust bearing race 48, the rolling element 54 placed between them, and a sliding sleeve 52 provide means for producing oscillation of a tool support. The rolling element 54 moves along the circle defined by the lower race at half the speed of the rotary race, relative to the stationary race. To roll the element through 360° about the axis of the tool means, two full revolutions of the tool 60 are needed.

Figure 8:
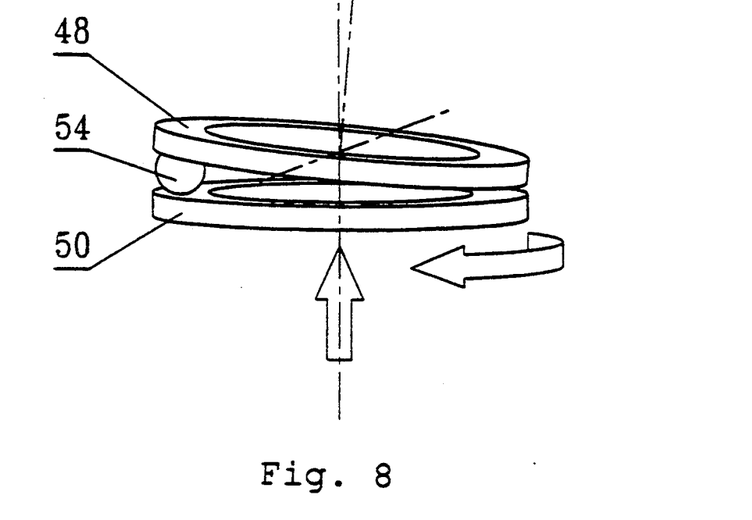
FIG. 8 is a perspective view of an oscillator used according to the present invention which shows the rotating race in its uppermost position.
Figure 9:
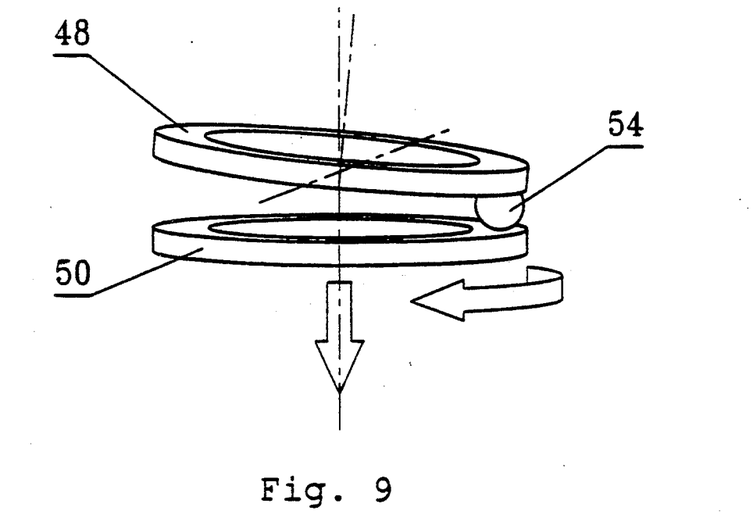
FIG. 9 is a perspective view of an oscillator used according to the present invention which shows the rotating race in its lowest position.
Figure 10:
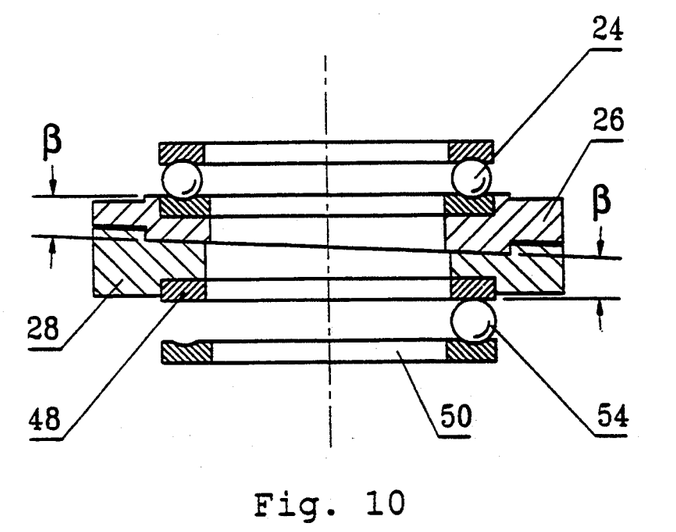
FIG. 10 is a cross-sectional view of an assembly which shows the adjusting rings in a relative angular position with respect to each other that produces zero amplitude of the rotary race oscillation.

With continued reference to FIGS. 8 and 9, the amount of axial displacement of the rotary thrust bearing race 50 relative to the stationary thrust bearing race 48, for given inclination angle $\beta$, depends on the angular position of the rolling element 54 about the axis "E" of the apparatus as the element rolls along the rotary race. This, in conjunction with the adjustment of the spindle feed advance motion, provides feed control means. At the same time, the stationary thrust race, the rotary race, and the rolling element placed therebetween provide means for producing kinematic dependence of the axial tool translations on the tool angular positions. The stationary race 48 is prevented from revolving about the tool axis by means of a guide way 36 and a slider 34 which, at the same time, allow for the feed motion of the apparatus. Preferably, the slider 34 is mounted on a shrink ring 38 that prevents the two adjusting rings 26 and 28 and the stationary race from revolving about the tool axis. The guideway 36 is preferably immobilized relative to the machine tool headstock and parallel with the axis of the tool 60. The guideway 36 and the slider 34 provide means for preventing rotation of the stationary elements of drive control means. As explained in greater detail above, to induce axial oscillation of the tool 60, the stationary race 48 is inclined relative to the rotary race 50. The required inclination is obtained by rotating the angular position of one of the two adjusting rings with respect to the other about their centerline. The angle $\beta$ is identical in each of the two rings, as shown in FIG. 10. As a result, there is a certain relative angular position of the two adjusting rings at which the stationary race is parallel with the rotary one. This position corresponds with the amplitude of oscillation equal to zero, as shown in FIG. 10.

Figure 11:
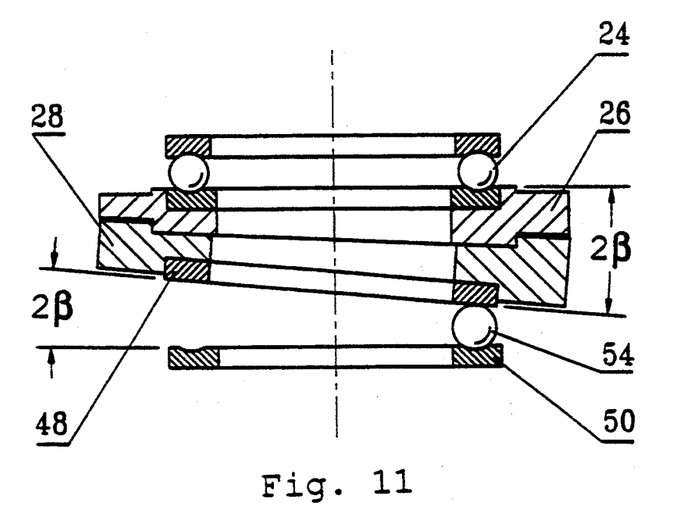
FIG. 11 is a cross-sectional view of an assembly which shows the adjusting rings in a relative angular position with respect to each other that produces maximal amplitude of the rotary race oscillation.

When one of the two rings is rotated with respect to the other through 180° from that position, the maximum inclination of the stationary race is obtained. This position corresponds with the maximum amplitude of oscillation. The maximum inclination of the stationary race 48 with respect to the rotary race 50 is equal to the sum of the inclinations of the faces of the upper and lower adjusting rings 26 and 28, that is, it is approximately equal to $2\beta$ as shown in FIG. 11. The two adjusting rings provide means for adjusting the tool nose path wave amplitude A shown in FIG. 2. Once the required adjustment of the inclination is obtained, the rings are preferably prevented from changing their relative angular position by two clamps 30 which press one of the rings against the other. Thus, the two clamps 30 provide means for preventing an uncontrollable change in the adjusted amplitude. To permit the chuck to rotate while the adjusting rings remain stationary, the rings 26 and 28 are separated from its body by a thrust bearing 24 that transmits the axial loading of the chuck.

As the rolling element 54 rolls between the races 48 and 50, the inclination of the stationary race 48 causes the element to translate the rotary race 50 periodically back and forth in the direction generally parallel with the axis of the tool 60. The rotary race 50 enforces oscillation of the sliding sleeve 52, the tool socket 58 and the tool itself. The amplitude of the oscillation depends on the inclination of the stationary race 48. In each cycle of oscillation, the return motion of the rotary race 50 is produced by a force generated by a compressed elastic ring 64 placed between a threaded plug 66 and a threaded sleeve 68. The force, transmitted by the sleeve, makes the tool means socket return and the rotary race to press the single rolling element against the stationary race. In this way, a continuous rolling contact between the rolling element and the two races is maintained. Preventing a loss of the contact is needed especially in this portion of the oscillation cycle in which the axial component of the cutting force is reduced to zero. The above mentioned adjusting rings, the stationary and rotary races, the rolling element, and the sliding sleeve form a mechanical oscillator that makes the tool means to occupy axial positions that strictly depend on its angular positions.

Referring once again to FIGS. 6 and 7, the preferred apparatus 18 for breaking continuous chips in accordance with the present invention includes a tapered shank 20 whose cylindrical lower portion is connected by a shrink fit with a guiding sleeve 22. The upper end portion of the sleeve 22 is preferably formed into a flange that supports the upper race of a thrust ball bearing 24. The lower race of the bearing 24 is preferably mounted in a seat made in the upper adjusting ring 26. The ring 26 rests on a lower adjusting ring 28. The upper and lower face surfaces of the rings 26 and 28 are inclined relative to each other. In the preferred embodiment, the inclination is identical. The rings 26 and 28 are pressed against each other by two clamps 30 through nuts 32 and prevented from rotating about the tool axis by slider 34 and guideway 36.

With continued reference to FIGS. 6 and 7, the slider 34 is mounted on a shrink ring 38 fitted on the lower adjusting ring 28. The guideway 36 is preferably stationary and may be installed on the machine tool headstock. It is parallel with the axis of the tool. The heads of the clamps 30 form pistons which are acted upon with a pressure by a hydraulic substance preferably having a grease-like consistency. The hydraulic substance fills a system of channels 40 made in the lower adjusting ring 28. The system of channels 40 joins the piston chambers with a chamber 42 where the pressure is generated. The pressure is produced by a pin 44 pushed by a threaded knob 46. In the lower adjusting ring 28, a stationary race 48 of the cam oscillator is seated. The rotary race 50 of the oscillator rests on the top surface of a sliding sleeve 52. Between the stationary and rotary races 48 and 50, the rolling element 54 is placed. In the preferred embodiment, the element 54 is held between the races 48 and 50 by a cage 56, which is preferably constructed of Teflon.

The sliding sleeve 52 is connected by shrink fit with the tool socket 58 in which a tool 60 is mounted. The sliding sleeve 52 is prevented from rotating relative to the guiding sleeve by a key (or a spline) 62. An elastic ring 64 keeps the balls and races of the thrust bearing and the oscillator in contact with each other when not loaded by the axial component of the cutting force. In the preferred embodiment, the elastic ring 64 rests on a flange of a threaded plug 66 which is secured in the shank 20. The ring 64 supports the tool socket through a threaded sleeve 68, which is joined with the tool socket.

With continued reference to FIGS. 6 and 7, a removable tang 70 plugs the axial hole in the shank 20 that contains a drift 72, which aids removing the tool from its socket. The thrust bearing and the oscillator are protected from outside by two cylindrical shields. The lower shield 74 and the upper shield 76 are preferably press fit on the shrink ring 38 and the upper adjusting ring 26, respectively. A scale 78, made on the upper shield, indicates amplitude of tool oscillation. A pointer 80, preferably located on the shrink ring 38 makes it possible to read out the amplitude adjusted.

While the best mode for carrying out the invention has been described in detail, those familiar with the art to which this invention relates will recognize various alternative designs and embodiments for practicing the invention as disclosed by the following claims.

What is claimed is:

1. A method for generating intermittent chips when machining a hole in a stationary workpiece on a machine with a rotating tool having one or more cutting edges, comprising the steps of:

(I) rotating the tool about an axis of rotation coinciding with the centerline of a machined surface to be produced;

(II) causing the tool to achieve strictly determined and controlled positions along its feed advance path in response to the tool angular positions when cutting, so that (a) a tool nose path described on the machined surface of the workpiece is wavy and has a constant wave amplitude A and wave length $\lambda$, said wave amplitude A and wave length $\lambda$ being capable of adjustment, (b) a distance p between neutral lines of any two consecutive tool nose path coils, produced by a given tool nose, is constant but adjustable, said distance p being capable of adjustment, and (c) a phase $\phi$ is produced between waves of any two consecutive tool nose path coils produced by a given tool nose, that is equal to $2\pi[N-I(N)]$, where N is a selected number of waves of said wavy tool nose path per circumference of the machine surface of said hole and I(N) is the integer part of said N;

(III) controlling said wave amplitude A according to the inequality $$A \geq \left| \frac{p}{2n} \operatorname{cosecant}\left( \frac{N}{n} \pi \right) \right|$$

where p is said constant distance, N is said selected number of waves, and n is the number of major cutting edges in the tool, whereby the undeformed chip thickness varies periodically and reduces to zero in each period of its variation, thereby generating intermittent chips, or causing in some materials chip breakage when said amplitude is slightly less than that resulting from said inequality; and (IV) adjusting said amplitude A and said phase $\phi$ in any combination to achieve a desired surface finish and tool life.

2. An apparatus for forming intermittent chips when machining a hole in a stationary workpiece with a rotating tool, comprising:

tool drive means for causing rotation of the tool;

tool feed drive means for overcoming forces resisting machining the workpiece which act along the tool feed advance path and for driving said tool so that a tool nose path is wavy and has an amplitude A which is based on the number of major cutting edges in the tool, said tool nose path being capable of adjustment, and feed control means in operative communication with said tool feed drive means for causing the tool to achieve strictly determined and controlled positions along said tool feed advance path in response to the angular positions of the rotating tool when cutting.

3. The apparatus of claim 2, wherein said tool feed drive means comprises:

constant feed drive means for causing a distance p between neutral lines of any two consecutive tool nose paths to be constant, said distance being capable of adjustment; and varying feed drive means in communication therewith for causing said tool nose path to be wavy.

4. The apparatus of claim 3, wherein said varying feed drive means comprises:

controllable drive means for producing changes in position occupied by the tool in response to changes in the angular position of the tool;

means for producing oscillation of a tool support in communication therewith relative to said constant feed drive means; and means for transmitting oscillation from said oscillating tool support to said tool.

5. The apparatus of claim 4, wherein said controllable drive means comprises:

a stationary thrust race having an inclination angle relative to the axis of rotation of the apparatus which may be adjusted in accordance with the required amplitude of the tool oscillation.

6. The apparatus of claim 4, wherein said means for producing oscillation of a tool support comprises:

a rotary thrust race;

a stationary thrust race;

a single rolling element placed between said rotary thrust race and said stationary thrust race; and a movable element that is driven by a force transmitted through said rotary thrust race during the forward half of the oscillation cycle of said tool means and by a force produced by an elastic element as well as said force that resists machining and which acts along axis of rotation of said tool means during the return half of said oscillation cycle.

7. The apparatus of claim 4, wherein said means for transmitting oscillation comprises:

a tool means socket operatively connected with said movable element.

8. The apparatus of claim 2, wherein said feed control means comprises:

means for adjusting and controlling a constant feed drive means;

means for sensing said angular position of said tool workpiece in communication therewith; and means for generating a control signal based on the angular position to be followed by a variable feed drive means.

9. The apparatus of claim 8, wherein said means for sensing angular positions of said rotating tool comprises:

a rotating thrust race having angular positions which are substantially identical with the angular positions of the tool;

a stationary thrust race; and a single rolling element placed between said rotary thrust race and said stationary thrust race.

10. The apparatus of claim 8, wherein said means for generating a control signal comprises:

means for producing a kinematic dependence of the axial translations of the tool means on the tool means angular positions that defines the number of waves N of said wavy tool nose path per circumference of the machined surface;

means for adjusting the wave amplitude A of said tool nose path; and means for preventing rotation of said stationary thrust race.

11. The apparatus of claim 10, wherein said means for producing a kinematic dependence comprises a stationary thrust race, a rotary thrust race, and a single rolling element placed between said rotary thrust race and said stationary thrust race.

12. The apparatus of claim 10, wherein said means for adjusting said wave amplitude A comprises:

means for adjusting the position of said stationary thrust race relative to said rotary thrust race about an axis generally perpendicular to the centerline of said tool;

means for enabling reading out the adjusted amplitude of said oscillation movements; and means for preventing an uncontrollable change in said adjusted amplitude.

13. The apparatus of claim 10, wherein said means for preventing rotation of said stationary thrust race comprises:

a guideway that is substantially parallel with the centerline of said tool and stationary; and a slider coupled with said stationary thrust race and cooperating with said guideway to enable feed motion and prevent rotation of said stationary thrust race.

14. The apparatus of claim 12, wherein said means for adjusting said position comprises two adjusting rings whose upper and lower noncylindrical surfaces are inclined with respect to each other.

15. The apparatus of claim 12 wherein said means for enabling reading out said adjusted amplitude comprises:

an indicator coupled with one of said two adjusting rings and indicia coupled with said other of two adjusting rings, said indicator and said indicia cooperating with each other to provide an adjusted amplitude indication.

16. The apparatus of claim 12 wherein said means for preventing said uncontrollable change comprises means for pressing one of said two adjusting rings against the other to immobilize one with respect to the other by friction.

17. The apparatus of claim 14 wherein the angular position of one of said two adjusting rings can be changed relative to the other of said two adjusting rings.

18. The apparatus of claim 16 wherein said means for pressing said one of said two adjusting rings comprises:

a threaded knob capable of exerting a pushing force on a cylindrical pin;

a pressure chamber wherein said cylindrical pin generates pressure under the action of said pushing force;

at least one clamp chamber that contains elements driving clamps;

at least one clamp capable of pressing one of said two adjusting rings against the other;

a system of channels that join said pressure chamber with said clamp chambers; and a hydraulic substance that fills said system of channels, said chamber, and said at least one clamp chamber.

19. The apparatus of claim 18 wherein said hydraulic substance has a grease-like consistency and is capable of transmitting pressure from said pressure chamber to said at least one clamp chamber without leaking out from said at least one chamber.

20. The apparatus of claim 2, wherein said tool drive means comprises:

a machine tool spindle and its drive means;

shank means for transmitting forces and rotation from said machine tool spindle to said apparatus, the shank means including an axial hole disposed therein;

a thrust bearing for transmitting axial forces from said shank means to said feed drive means and for preventing rotation of said stationary thrust race;

a slidable mounted splined shaft or key connection to transmit rotation from said shank means to a translationally movable element;

a tool socket made in said translationally movable element; and a means for facilitating removal and/or change of said tool means from said apparatus.

21. The apparatus of claim 20 wherein said means for facilitating removal of said tool comprises:

a drift to aid removal of said tool from a socket in said apparatus; and a removable tang that plugs the axial hole in the shank means of said apparatus.

* * * * *